Oct. 1, 1940.	J. P. SPANG	2,216,216
MEAT-SLITTING MACHINE
Filed July 21, 1936	5 Sheets-Sheet 2

Inventor.
Joseph P. Spang
by Heard Smith & Tennant.
Attys.

Oct. 1, 1940. J. P. SPANG 2,216,216
MEAT-SLITTING MACHINE
Filed July 21, 1936 5 Sheets-Sheet 3
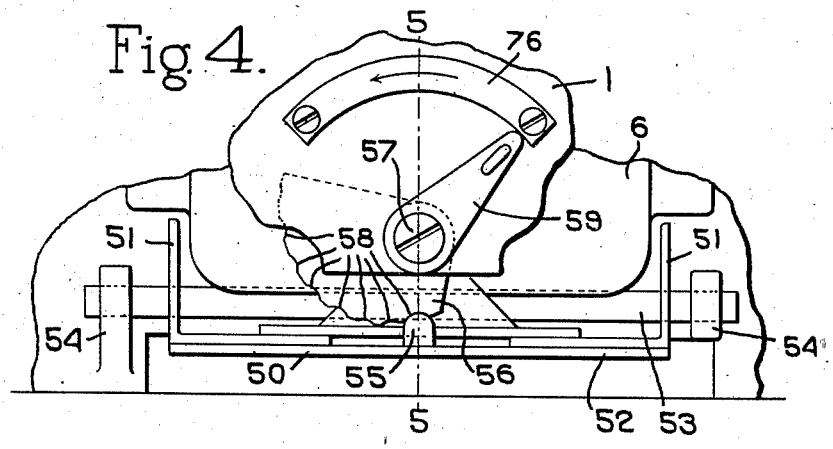
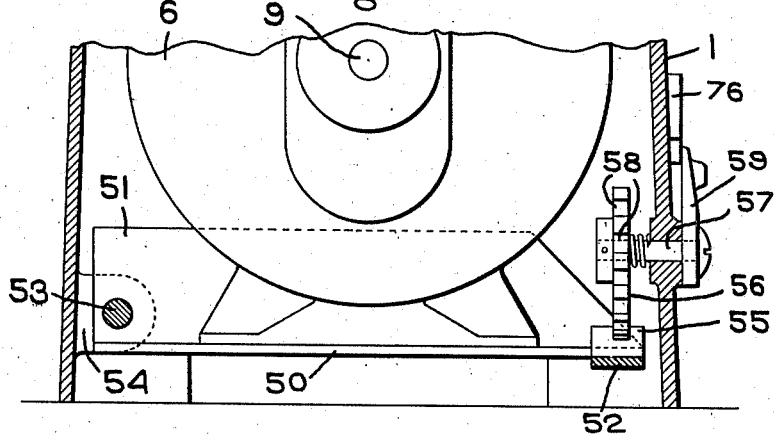
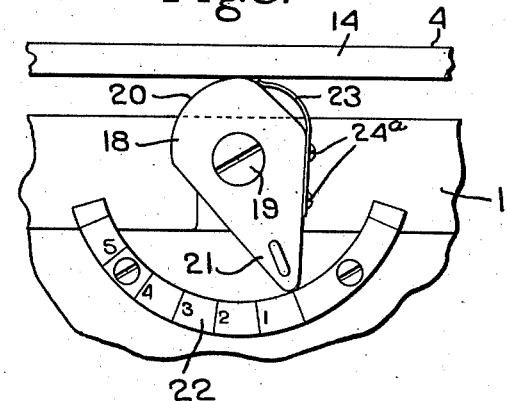
Inventor.
Joseph P. Spang
by Heard Smith & Tennant
Attys.

Oct. 1, 1940.    J. P. SPANG    2,216,216
MEAT-SLITTING MACHINE
Filed July 21, 1936    5 Sheets-Sheet 4
Fig. 7.
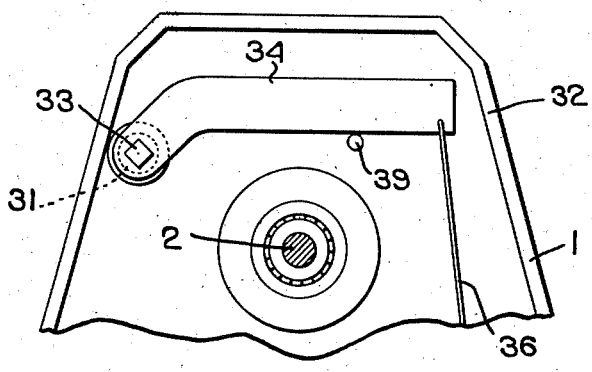
Fig. 8.
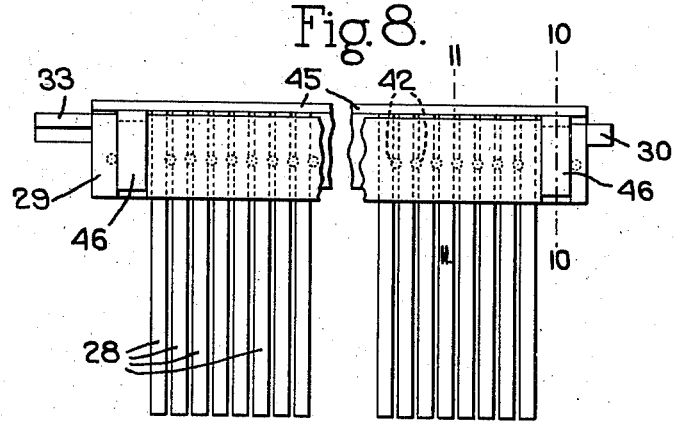
Fig. 9.  Fig. 10.  Fig. 11.  Fig. 12.
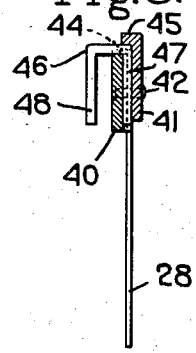 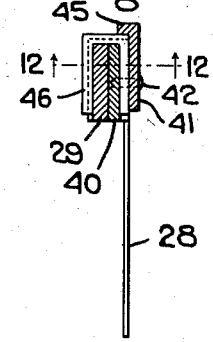 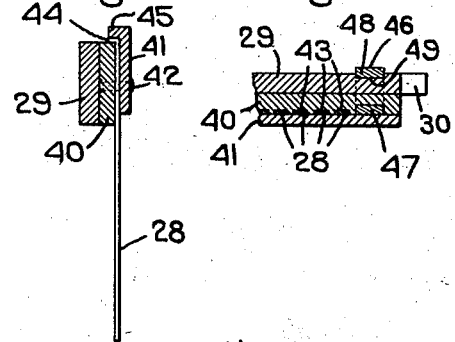
Inventor.
Joseph P. Spang
by Heard Smith & Tennant
Attys.

Oct. 1, 1940.  J. P. SPANG  2,216,216
MEAT-SLITTING MACHINE
Filed July 21, 1936  5 Sheets-Sheet 5

Inventor.
Joseph P. Spang
by Heard Smith & Tennant
Attys.

Patented Oct. 1, 1940

2,216,216

UNITED STATES PATENT OFFICE 2,216,216

MEAT-SLITTING MACHINE

Joseph P. Spang, Quincy, Mass., assignor to Cube Steak Machine Company, Inc., Boston, Mass., a corporation of Massachusetts Application July 21, 1936, Serial No. 91,676

3 Claims. (Cl. 17—27)

This invention relates to meat-slitting machines of that type comprising a set of rotary slitting knives, a supporting member situated beneath the knives and a meat-carrying plate on which the slice of meat to be slit is placed, which plate is separable from the machine and is adapted to move freely over the supporting member thereby to carry the slice of meat past the slitting knives.

The general object of the invention is to improve meat-slitting machines in the particulars hereinafter set forth.

In order to give an understanding of the invention I have illustrated in the drawings some selected embodiments thereof which will now be described after which the novel features will be pointed out in the appended claims.

In the drawings:

Fig. 4 is a fragmentary view showing the means for tightening the belt of the knife-rotating mechanism;

Fig. 5 is a section on the line 5—5, Fig. 4;

Fig. 6 is a fragmentary view showing one means for securing a relative adjustment between the knives and the supporting member;

Fig. 7 is a fragmentary view of part of the stripper;

Fig. 8 is a view of the stripper detached from the machine and with parts broken out;

Fig. 9 is a section through the head portion of the stripper on the line 10—10, Fig. 8 but showing the stripper removed from its mounting;

Fig. 10 is a section on the line 10—10, Fig. 8 showing the manner in which the stripper is mounted;

Fig. 11 is a section on the line 11—11, Fig. 8;

Fig. 12 is a section on the line 12—12, Fig. 10;

Figure 1:
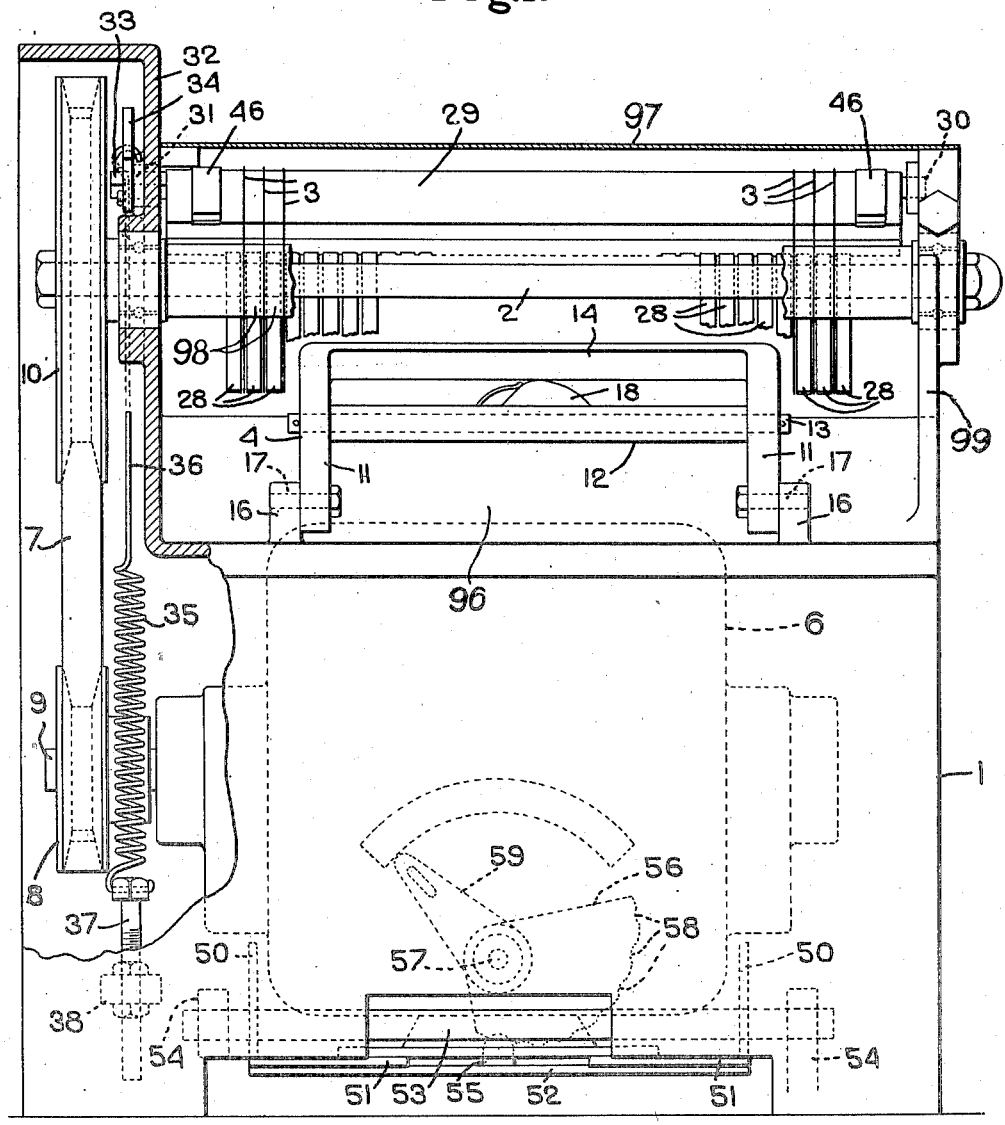
Fig. 1 is a side view with parts broken out showing a meat-slitting machine embodying my invention.

My improved meat-slitting machine comprises a main frame 1 having at its ends upstanding heads or standards 99, 32 in which is rotatively mounted a shaft 2 carrying a plurality of spaced rotary disk knives 3, a supporting member 4 situated beneath the knives, and carried by the table portion 96 of the frame, and a meat-carrying plate 5 on which the slice 15 of meat to be slit is placed and which is separable from the frame and is adapted to be freely moved over the supporting member 4, thereby to carry the slice of meat from one side to the other of the knives. 97 indicates a guard member which covers the knives and is carried by the standards 32, 99. The knives 3 are spaced from each other by suitable spacers 98.

The knife-carrying shaft 2 is preferably a power-driven shaft and may be rotated by any suitable or usual power mechanism.

I have shown for this purpose an electric motor 6 which is supported by the frame 1 beneath the knives, and which is operatively connected to the shaft 2 by a driving belt 7 that passes over a pulley 8 on the motor shaft 9 and also over a driving pulley 10 fast on one end of the shaft 2.

The supporting member 4 which supports the separable meat-carrying plate 5 during its travel from one side to the other of the knives 2 is preferably, although not necessarily, a skeleton member, and said member also preferably is provided with one or more rolls 12 with which the plate 5 contacts as it is moved over the supporting member 4, thereby facilitating the movement of the plate over the platform.

In the construction shown in Fig. 1 the supporting member 4 has a general U shape with the arms 11 extending in the general direction of feeding movement of the plate 5 and forming tracks over which said plate 5 may slide. In the device shown in Figs. 1 and 2 this supporting member 4 carries a single roll 12 which is in the form of a sleeve mounted on and freely rotatable about a rod or pin 13 which extends from one arm 11 to the other and is supported thereby. The supporting member 4 is shown as being so located in the machine that the bridge portion 14 of the U-shaped member 4 is located on the side of the knives 3 at which the meat is fed into the machine, while the ends of the arms 11 of the member 4 are situated on the delivery side of the knives 3. As stated above, the meat-carrying plate 5 is separable from the machine, and in using the machine a slice 15 of meat will be placed on the plate 5 when the latter is separated from the machine and then the plate 5 with the slice 15 of meat thereon is introduced into the machine at the right-hand side in Fig. 2 by being placed manually on the bridge portion 14 of the platform 4 and manually moved forwardly over the arms 11 until the knives begin to cut the meat, as shown in full lines, Fig. 2. The knives are rotating in a clockwise direction, Fig. 2, so that the portion of each knife which is engaging the meat is moving in the general direction of the feeding movement of the meat, and as a result the friction of the knives on the meat tends to feed the meat and the plate 5 forwardly.

Figures 2, 3:
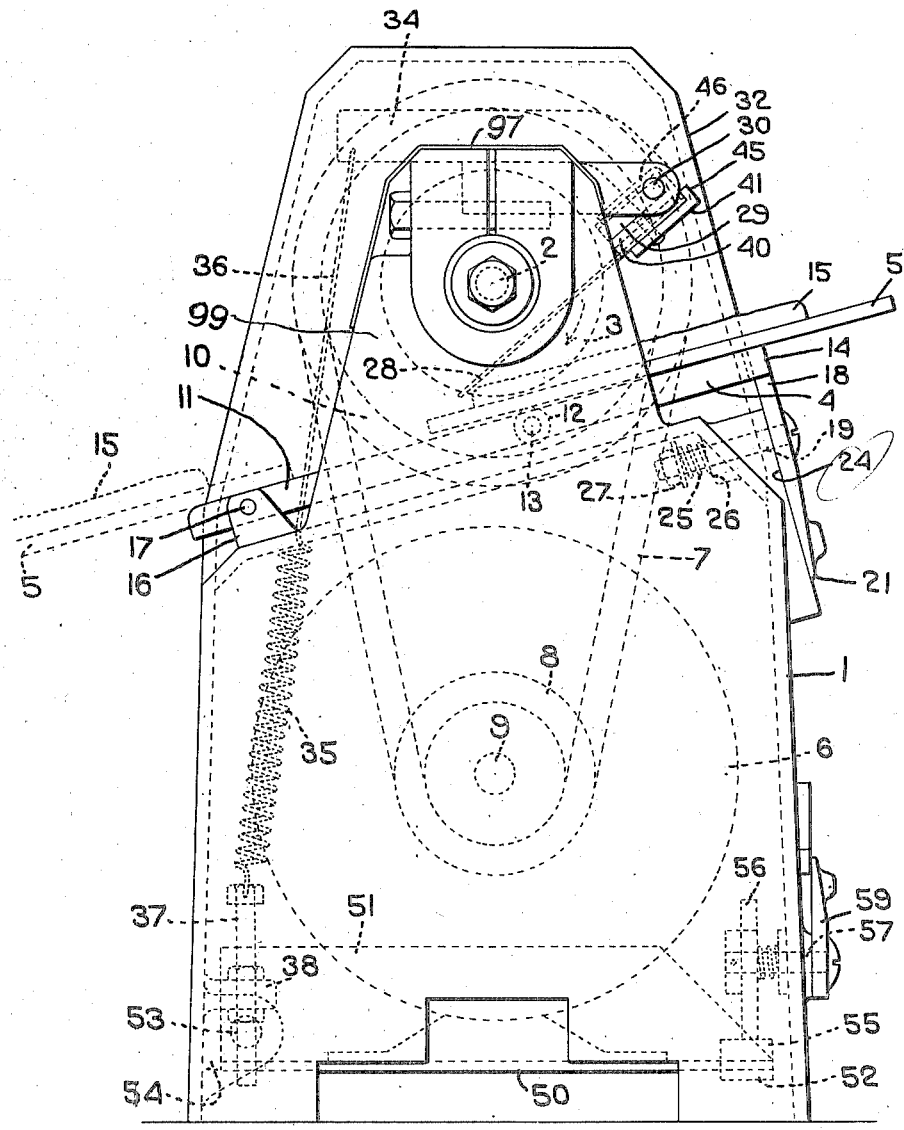
Fig. 2 is an end view of Fig. 1.
Fig. 3 is a perspective view of the meat-carrying plate having a slice of meat thereon.

As the plate 5 moves forwardly over the supporting member 4 a series of slits will be cut in the meat in the direction of the feeding movement, and when the plate 5 has passed completely underneath the knives it will be discharged from the machine at the discharge end which is the left-hand end in Fig. 2, as shown by dotted lines.

The attendant receives the plate 5 as it is thus discharged from the machine and then again introduces it into the machine at the right-hand side Fig. 2, but in such position that the slits which are cut in the meat during the second pass of the plate beneath the knives will be formed at right angles to the slits which were cut during the first pass beneath the knives, thereby slitting the meat 15, as indicated in Fig. 3.

It will be understood, of course, that the plate 5 has a transverse dimension greater than the distance between the arms 11 so that the plate bridges the arms as it moves over the supporting member 4. In Figs. 1 and 2 the roll 12 is situated directly beneath the knives and hence supports the plate 5 at the point where the knives are acting on the meat.

Means are provided for adjusting the relative position of the supporting member 4 and the knives 3, thereby to provide for cutting the slits to a greater or less depth. The relative adjustment between the knives and the supporting member 4 may be secured either by adjusting the plate 5 relative to the knives or adjusting the knives relative to the plate. In Figs. 1, 2 and 6 I have shown an embodiment of the invention wherein the supporting member 4 is adjustable vertically relative to the knives.

The front ends of the arms 11 of the supporting member 4 are pivotally connected to lugs 16 as shown at 17, and means are provided for raising or lowering the bridge portion end 14 of the supporting member 4, thereby moving said supporting member toward or from the knives 3. For this purpose I have provided an adjusting cam member 18 which is pivoted at 19 to the frame 1, and which is provided with a cam surface 20 adapted to engage the under side of the bridge portion 14. This cam member 18 is formed with a finger piece 21 by which it may be turned about its pivotal support 19, and as said cam member is turned the cam face 20 will effect a raising or lowering of the bridge portion 14 of the supporting member 4, said member turning about its axis 17 during such raising and lowering movement.

22 indicates an index secured to the frame and cooperating with the finger piece 21 to indicate the proper position of the cam 18 for making slits of different depth.

Fig. 6 shows the cam adjusted to position the supporting member 4 for making a slit of a maximum depth without cutting clear through the meat. If the cam 18 is adjusted clockwise Fig. 6, then the cam surface 20 provides for a lowering movement of the bridge portion 14 of the supporting member 4, thereby separating said supporting member from the knives, which will result in making a slit of less depth.

The machine herein shown is adapted not only to cut in a slice of meat slits which extend partially through but not entirely through the slice, but also to cut slits which extend entirely through the slice. For this purpose the cam 18 is constructed with a high portion 23 which, when brought into engagement with the bridge portion 14 of the supporting member 4, raises said member into a position in which the knives will contact with the top surface of the plate 5 during the movement of said plate beneath the knives. With this adjustment the knives will cut clear through the meat and by making the cuts in two directions, as shown in Fig. 3, a slice of meat may be cut into separate cubes. With this adjustment the machine is also adapted for cubing vegetables.

The highest portion 23 of the cam is radially yieldable and is shown as formed by a spring finger bent to the desired shape and secured to the cam member by means of screws 24a. One object of making this high portion of the cam yielding is so that the supporting member 4 may give slightly, if necessary, to enable the plate 5 to be carried past the knives while in contact therewith when it is desired to cut clear through the slice of meat. The radially yielding high portion 23 of the cam is so designed that when the cam 18 is turned to bring said radially yielding portion into engagement with the supporting member 40, the latter will be adjusted so that the knives will be in substantial contact with the meat-supporting plate. In such case, the knives will cut clear through the meat, thus cutting the slice into strips. The yielding quality of the high portion 23 provides a yielding engagement between the knives and the plate which prevents injury to the knives and allows the plate to yield slightly if necessary. Further, such yielding characteristic of the cam surface 23 permits a downward yielding movement of the plate and meat-supporting member to avoid injury to the knives in case the latter encounter hard substances when slitting the meat.

The cam 18 has a flat face which lies against a flat face 24 formed on the frame 1, and said cam is frictionally held in any adjusted position by the action of a spring 25 which encircles the inner end of the pivot pin 19 and is confined between a boss 26 with which the frame is provided and a nut or collar 27 on the pin 19. The action of the spring is to hold the flat face of the cam yieldingly in contact with the flat face 24, thereby frictionally retaining the cam in its adjusted position.

The knives 3 have associated therewith a suitable stripper mechanism which serves to hold the meat 15 on the plate 5 during the slitting operation and to prevent the meat from being lifted off the plate by the rotative movement of the knives. This stripper is in the form of a plurality of stripper fingers 28 which are situated at a slight angle and are received between the knives as shown in Fig. 2. These stripper fingers are mounted so that they may yield backwardly or upwardly to accommodate slices of meat of different thicknesses. For this purpose said stripper fingers are carried by a supporting bar 29 which is provided at its ends with trunnions 30, 31 that are rotatably mounted in the head portion 32 of the frame. The supporting bar 29 is acted on by a spring which yieldingly holds said bar in the position shown in Fig. 2 but which by its yielding movement permits said bar 29 to have a clockwise swinging movement, which results in an upward swinging movement of the stripper fingers 28.

The trunnion 31 has a flat-sided extension 33 on which is mounted an arm 34, and said arm has a pulling spring 35 connected thereto through a suitable connection 36. The lower end of the spring 35 is anchored to an adjusting screw 37 which screws through a boss 38 with which the frame is provided, this construction serving as a means for varying the tension on the spring 35. The pulling action of the spring 35 normally holds the stripper fingers 28 in about the position shown in Fig. 2, in which position the lower ends of the stripper fingers will engage the meat 15 as it passes beneath the knives. If a thick slice of meat is being slit the pressure of the meat against the stripper fingers 28 will raise the latter, thus turning the supporting bar 29 against the action of the spring 35 which will hold the fingers yieldingly against the meat. The stripper fingers 28 thus apply pressure to the slice 15 of meat and press said slice firmly against the plate 5. This yielding pressure of the strippers against the meat produces a certain amount of frictional drag between the plate 5 and the supporting member 4, which, together with the pressure of the fingers against the meat, serves to retard the movement of the plate 5 with its slice 15 of meat through the machine so that the knives will operate on the meat with a draw cut.

While the rapidly rotating knives are acting on the slice of meat, the portions of the knives which cut into the slice exert a forward pulling force on the slice. So long as the frictional engagement between the slice 15 and the plate 5 is greater than the frictional engagement between said plate and the supporting member 4, the forward pulling force exerted on the meat by the rotating knives will be conveyed to the plate through the slice of meat. If, however, the frictional engagement between the slice 15 of meat and the plate 5 were less than that between the plate and the supporting member 4, there would be a tendency for the knives to pull the slice of meat off from the plate.

One purpose of the roll 12 above referred to is to prevent this from happening. This roll is situated directly beneath the knives, and since the upper surface thereof projects slightly above the upper surface of the supporting member 4, the portions of the plate directly beneath the knives will have a rolling contact with the roll. This rolling contact relieves somewhat the friction between the plate 5 and the supporting member 4, thus greatly reducing, if not entirely eliminating, the possibility that the action of the rapidly rotating knives on the meat will pull the meat off from the plate.

The roll 12 is an idler roll, and, therefore, exercises no control over the feeding movement of the plate 5, and the latter may be manually fed through the machine at a faster or slower speed at the discretion of the operator.

39 designates a stop projection on the portion 32 of the frame and which limits the downward movement of the arm 34.

The stripper is shown as detachably secured to the supporting bar 29, thus enabling the stripper to be readily removed from the machine when it is necessary to clean it. The upper ends of the stripper fingers 28 are secured to a head comprising two bars 40, 41 between which the ends of the fingers are held, said bars 40, 41 being riveted together as at 42. One of the bars, the bar 40 as herein shown, is provided with a series of recesses 43 in which the fingers 42 are received and the outer end of each finger is bent at right angles, as shown at 44, to engage the edge of the bar 40. The other bar 41 also has a lip or rib 45 at one edge which overlies the bent ends of the fingers, thus preventing them from movement in the direction of their length. The stripper head 40, 41 is provided at each end with a hook member 46 adapted to be hooked over the supporting bar 29. Each hook-shaped member has a U shape with one leg 47 clamped between the bars 40, 41 and the other leg 48 spaced from the bar 40 a sufficient distance to receive the supporting bar 29. The stripper can thus be readily placed on or removed from the bar 29 Said bar 29 is provided with grooves 49 in which the legs 48 of the hook-shaped members are received, said grooves serving to hold the stripper from longitudinal movement relative to the bar 29.

The motor 6 is shown as mounted on a platform which can be adjusted vertically relative to the frame 1 for the purpose of maintaining the driving belt 7 under proper tension. This motor-supporting platform is indicated generally at 50 and it comprises two angle-iron members 51 which are connected at their front end by a cross bar 52. The motor is supported on the horizontal legs of the two angle-iron members. These angle-iron members 51 are pivotally mounted at their rear ends on a shaft 53 which is carried by lugs 54 with which the frame 1 is provided. The weight of the motor 6 tends to swing the motor platform 50 downwardly about its pivot 53, thereby holding the driving belt 7 tight.

I have provided herein means for preventing the motor platform 50 from being moved upwardly due to the driving force of the belt 7. For this purpose the connecting bar 52 is provided with a lug or projection 55 which is adapted to engage a cam-shaped member 56 which is fast on a shaft 57 journalled in the main frame 1. The periphery of the cam member 56 is shown as provided with a series of recesses or indentations 58 that cooperate with the projection 55 to hold the cam member in any adjusted position. The shaft 57 is provided at its outer end with an arm 59 by which the shaft may be turned. The cam member 56 will be adjusted to bring its periphery into engagement with the projection 55, thereby preventing the platform 50 from being lifted upwardly.

Figure 13:
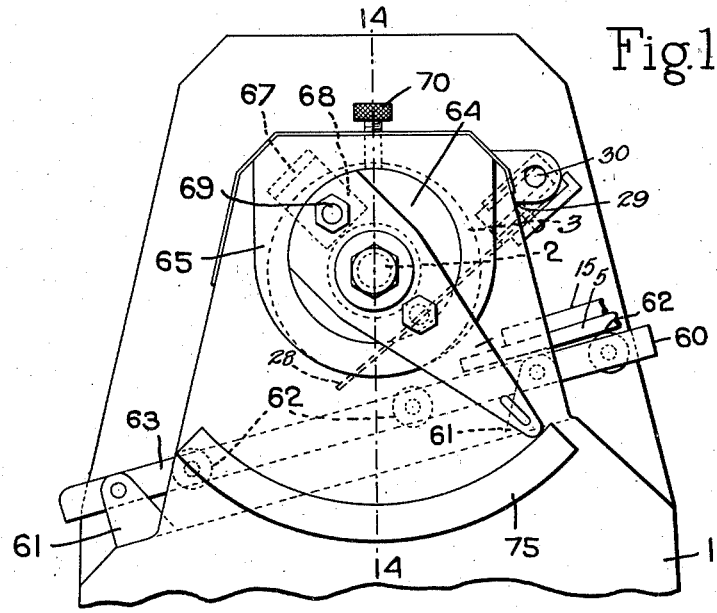
Fig. 13 is a fragmentary view showing a different embodiment of the inention than that shown in Figs. 1 to 4.
Figure 14:
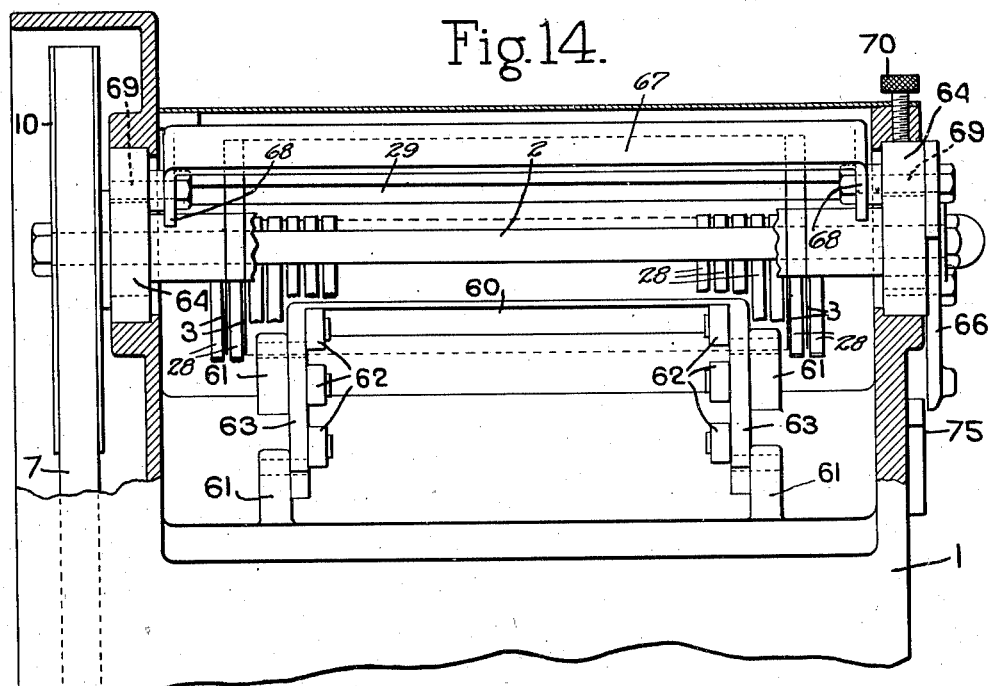
Fig. 14 is a sectional view on substantially the line 14—14, Fig. 13.

In Figs. 13 and 14 there is shown an embodiment of the invention which is similar to that shown in Figs. 1–12 in all respects except the particular manner in which the knives and the supporting member are adjusted relative to each other. In Figs. 1–12 this adjustment is effected by adjusting vertically the supporting member for the plate 5, while in the embodiment shown in Figs. 13 and 14 this relative adjustment is effected by adjusting the knives toward and from the supporting member.

In the embodiment shown in Figs. 13 and 14 the supporting member for the plate 5 has a fixed position, and the knife shaft 2 with the knives 3 thereon is adjustable vertically to vary the depth of cut. In this embodiment the supporting member is indicated at 60 and is stationarily supported by lugs or ears 61. This supporting member 60 is shown as a U-shaped member, it having a shape similar to the supporting member 4, but it differs from the member 4 in that it is stationarily carried by the lugs 61. The numerals 62 indicate rolls mounted on the arms 63 of the U-shaped member 60 and which serve to support the plate 5 in its movement over the supporting member.

The knife shaft 2 is journalled at its ends in bearings 64 which have an eccentric relation to the shaft, these bearings being eccentrically mounted in the portions 65 of the frame. One of the eccentrically-mounted bearings 64 has an arm 66 fast thereto by which it may be turned and the two bearings 64 are connected by a bar 67, the ends of which are downturned as at 68 and are bolted to the bearing members by suitable bolts 69.

The swinging of the arm 66 thus turns the bearing members 64 in their supports, and because the knife shaft is eccentrically mounted in the bearings such turning movement of the bearings will raise and lower the shaft relative to the support 60.

By this means the relative spacing between the knives and the support 60 may be adjusted so that the knives will cut slits of any desired depth. Before thus adjusting the knife shaft the cam member 56 should be turned out of engagement with the projection 55 so as to allow for any desirable upward movement of the knife shaft without straining the belt 7. When the knives have been adjusted to their desired position then the cam 56 is turned so as to bring the cam surface against the projection 55, thereby preventing the motor-supporting platform from upward movement.

70 indicates a set screw carried by the frame and by which the bearing members 64 are locked in any adjusted position.

I claim:

1. A meat-slitting machine comprising a set of rotary knives, a vertically-moving supporting member situated beneath the knives, a meat-carrying plate separable from the machine and adapted to move over the supporting member thereby to carry the meat to be sliced past the knives, and a cam member for adjusting the supporting member vertically and thus determining the proximity of the knives to the meat-carrying plate, said cam having an eccentric cam surface, the highest portion of which is radially yieldable, and, when in engagement with the supporting member, holds the meat-carrying plate yieldingly in substantial contact with the knives.

2. A meat-slitting machine comprising a frame, a set of rotary slitting knives journaled therein, knife-rotating mechanism, a meat-conveying plate separable from the machine, a supporting member pivotally mounted on the frame at one side of the knives and providing an extended surface over which said plate may freely slide from a position on one side of the knives to a position on the other side of said knives, thereby to carry a slice of meat past the knives, stripper fingers to engage and apply yielding pressure to said slice of meat while it is being acted on by the knives, an idler roll carried by the supporting member and situated beneath the knives, said roll serving to provide a free rolling support for the plate directly beneath that portion of the slice of meat that is being acted on by the knives, whereby the pressure of the stripper fingers against the meat produces a greater frictional engagement between the meat and the plate than between the plate and the supporting member, and means for adjusting the supporting member about its pivot for the purpose of varying the depth of the slits cut in the meat.

3. A meat-slitting machine comprising a frame, a set of rotary slitting knives journaled therein, a knife-rotating mechanism, a meat-carrying plate separable from the machine, a U-shaped supporting member having its arms pivotally mounted on the frame at one side of the knives and providing an extended supporting surface over which said plate may freely slide from a position on one side of the knives to a position on the other side of said knives, thereby to carry a slice of meat past the knives, stripper fingers to engage and apply yielding pressure to the slice of meat while it is being acted on by the knives, an idler roll carried by the arms of said U-shaped supporting member and situated beneath the knives, said roll serving to provide a free rolling support for the plate directly beneath the portion of the slice of meat thereon that is being acted on by the stripper fingers, and a cam engaging the bridge portion of the U-shaped supporting member and by which it can be adjusted vertically about its pivot.

JOSEPH P. SPANG.